I. S. Roland,
Tilting Gate,
Nº 16,400.
Patented Jan. 13, 1857.
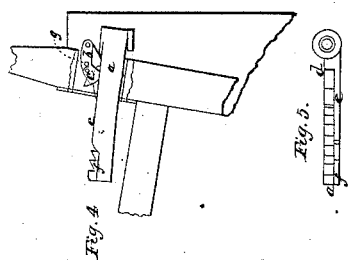
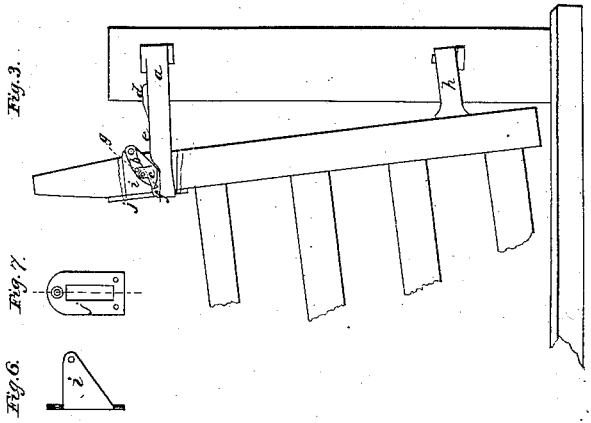
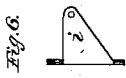
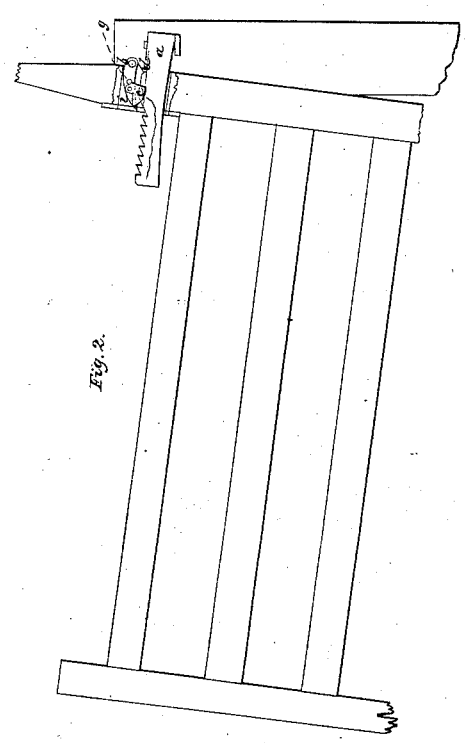
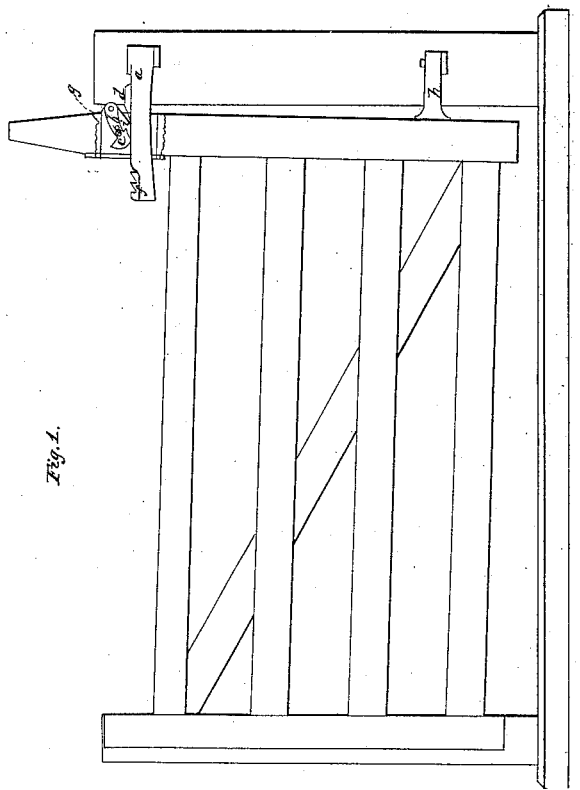

UNITED STATES PATENT OFFICE.

ISAAC S. ROLAND, OF WEST EARL, PENNSYLVANIA.

METHOD OF HANGING FARM-GATES.

Specification of Letters Patent No. 16,400, dated January 13, 1857.

*To all whom it may concern:*

Be it known that I, ISAAC S. ROLAND, of West Earl, in the county of Lancaster and State of Pennsylvania, have invented a new and useful Improvement in Farm-Gates; and I do hereby declare that the following is a full and exact description thereof, reference being had to the accompanying drawings, making a part of this specification, Figure 1 being a side elevation of my improved gate; Figs. 2, 3, and 4, views showing the positions of the respective parts combined with the upper hinge of the gate when the gate is thrown into different positions; Fig. 5, a top view of the main portion of the upper hinge of said gate detached, and Figs. 6 and 7 are views of a portion of said gate detached.

Similar letters indicate like parts in all the figures.

The eyes in the upper and lower portions $a$, $h$, of the hinges which are combined with the gate, are made so much larger than the bracket-pivot on the supporting post, that they allow the gate to be thrown into any desired inclined position. The lower hinge-arm $h$, is permanently secured to the gate in any suitable manner. The upper hinge-arm $a$, works through an elongated mortise in the inner upright of the gate frame. The said arm $a$, has a series of rack teeth on its upper edge, and is otherwise of the shape represented in the drawings. In front of the series of rack teeth on the hinge-arm $a$, and rising to the same height of said teeth, a ledge $e$, extends from the outer extremity of said series of rack teeth nearly to the inner end of said arm, where the said ledge slopes downward to a plane $f$, which is below the base of said series of rack teeth. At the outer extremity of the series of rack teeth, an inclined projection $d$, rises above the upper surface of the arm $a$, as shown in the drawings.

A pawl $b$, works in the upper portion of the mortise which receives the arm $a$, of the upper hinge;—which pall is hinged to ears $i$, $i$, that project from the metallic facing $j$, of said mortise and form linings to the sides thereof, as shown in Fig. 6. A cam $c$, of the shape shown in the drawings, works on a pivot projecting from the front side of the pawl $b$; and a short distance in the rear of the pivot which carries the cam C, a corresponding pivot $g$, projects from the front side of said pawl ($b$,) and limits the vibration of the cam $c$, in that direction.

By throwing the gate into the position shown in Fig. 3, the cam $c$, will fall into such a position as will allow the pawl $b$, to rest on the series of ratchet teeth on the hinge-arm $a$; and as the outer end of the gate is elevated from that position, the friction of the lower angle of the cam $c$, against the ledge $e$, will keep the cam in the position shown in Fig. 1, and allow the pawl to act against each one of the said ratchet teeth until the continued elevation of the outer end of the gate, brings the end of the pawl $b$, on to the top of the projection $d$, as shown in Fig. 4. When the said pawl is thus elevated, the cam $c$, will fall into the position represented in Fig. 4, and consequently as the outer end of the gate descends from that position, the friction of the under surface of the cam $c$, against the ledge $e$, will preserve the said position of said cam and keep the pawl $b$, elevated entirely clear of the ratchet teeth on the hinge-arm $a$, until the continued descent of the outer end of the gate brings the cam $c$, down into the recess $f$, of the ledge $e$, which will cause the vibrating end of the pawl to drop upon the ratchet teeth on the hinge-arm $a$, and arrest the farther descent of the outer end of the gate.

It will therefore be perceived, that by the arrangement and operation of the respective parts of my improved upper hinge for farm gates, a gate may be retained at any desired degree of inclination, and when it is desired to let the outer end of the gate down to its lowest position, it can readily be done by elevating the outer end of the gate to such a height that the vibrating end of the pawl $b$, will be elevated by the projection $d$, above the ratchet teeth on the hinge-bar $a$, when the cam $c$, will prevent the pawl from acting again upon said ratchet teeth until the outer end of the gate shall reach its extreme lowest position; when it will be caught and retained by said pawl, and the said pawl from that point to nearly the extreme upper position of the outer end of the gate, will catch and hold the gate in any degree of inclination as herein before set forth.

Having thus fully described my improvement in farm-gates, what I claim therein as new and desire to secure by Letters Patent, is—

Constructing the upper hinge of said gate of the peculiarly shaped hinge-arm $a$, the pawl $b$, and the cam $c$, when the said parts are combined and operate with each other, in connection with the loose play of the bracket-pivots in the eyes of the upper and lower hinge-arms, substantially in the manner and for the purpose herein set forth.

The above specification of my improvement in farm gates signed and witnessed this 27th day of Nov. 1856.

ISAAC S. ROLAND.

Witnesses:
JOHN K. FURLOW,
WILLIAM I. KAFROTH.